United States Patent [19]
McIntier

[11] 3,882,792
[45] May 13, 1975

[54] AUTOMATIC PALLET CAR CONVEYOR

[75] Inventor: Edwin Ralph McIntier, Madison, Conn.

[73] Assignee: Richard G. Sweitzer, Madison, Conn.

[22] Filed: May 3, 1974

[21] Appl. No.: 466,785

[52] U.S. Cl. .................. 104/162; 198/19; 198/218; 425/453
[51] Int. Cl. ............................................ B65g 25/10
[58] Field of Search ...... 104/134, 162, 176; 269/56; 425/453; 198/19, 34, 218, 221, 226

[56] References Cited
UNITED STATES PATENTS
3,465,690  9/1969  Landry et al. ...................... 104/162
3,666,076  5/1972  Miller et al. .......................... 198/19

Primary Examiner—M. Henson Wood, Jr.
Assistant Examiner—Robert Saifer
Attorney, Agent, or Firm—Dike, Bronstein, Roberts, Cushman & Pfund

[57] ABSTRACT

An apparatus for automatically conveying pallet cars which carry one or more molds on them, each pallet car being moved successively to a pick-up station where it is latched onto a carriage which moves it into a mold pouring station such movement causing any pallet car previously at such station to be moved away to a position adjacent the pouring station. The carriage is then further actuated to unlatch the latched car at its preselected position at the pouring station and to move the pallet car that was previously at such station to a location more remote therefrom to open up a work area to be used for pouring the molds. The carriage is then automatically retracted to its original position without disturbing the position of the unlatched car whereupon pouring and cooling of the molds can take place.

9 Claims, 8 Drawing Figures

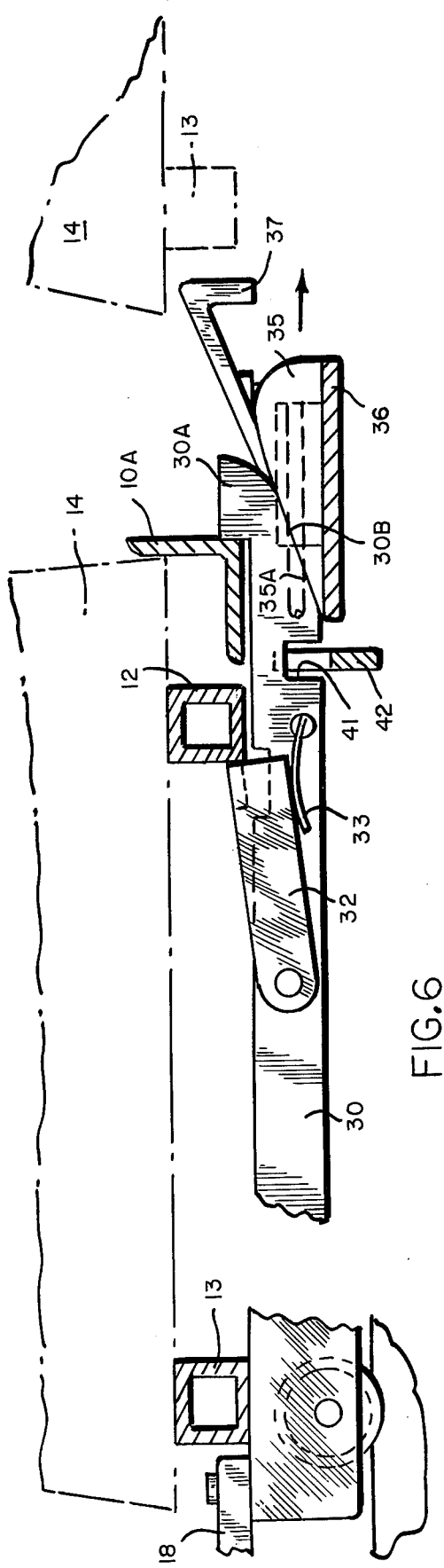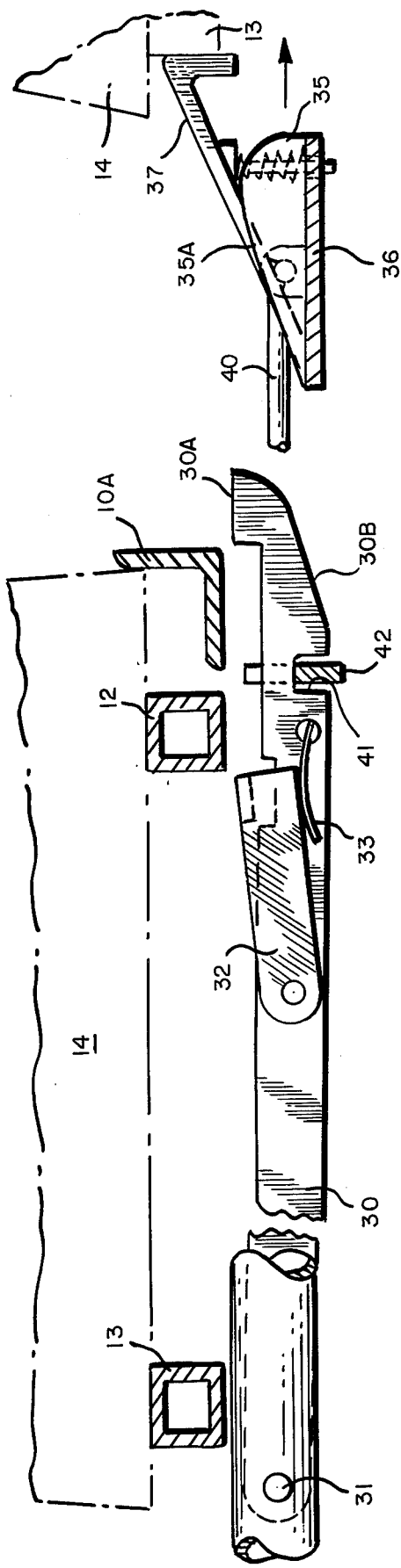

AUTOMATIC PALLET CAR CONVEYOR

This invention relates to apparatus for conveying mold carrying pallet cars as used in molding operations at foundries or other installations and, more particularly, to an automatic pallet car conveyor apparatus which delivers such cars from a loading station to a pouring station and, thence, to a mold separation station.

BACKGROUND OF THE INVENTION AND PRIOR ART

Equipment for producing molded items as used, for example, in foundries have generally required the use of several men who must manually load the molds on to pallet cars along a track to a pouring station where appropriate mold jackets are are affixed to the molds and pouring thereof takes place. The poured molds are then allowed to cool after which time the pallet car carrying the cooled molds is manually removed from the pouring station and pushed to a mold separation station where the molds can be removed from the car and the molded items separated therefrom. The pallet cars must then be manually pushed back to the mold loading station where new molds can again be loaded thereon for repetition of the operation. Such installation normally require several men to handle a multiple line of pouring stations and the efficiency of the overall operation is relatively low.

One improvement in such overall operation which has been suggested has been the use of a molding apparatus of the type described in U.S. Pat. No. 3,652,076 issued to E. R. MacIntier on Mar. 28, 1972. Such patent describes a molding apparatus for applying the mold jackets to the molds at the pouring station, which apparatus is both simple and economical to make and can be operated relatively easily and rapidly so as to produce uniform molding results. The molding apparatus used therein is durable and reliable and has been found to increase the efficiency of the pouring operation with less damage to the mold than previously encountered while at the same time bringing about decreased labor costs and fewer injuries. However, such apparatus still requires the manual conveying of the pallet cars to the mold pouring station where the molds must be accurately aligned manually before the pouring and cooling operation can take place. Further, after cooling, the molds must again be conveyed manually to an appropriate mold separation station.

SUMMARY OF THE INVENTION

This invention further improves the operation of a multiple pallet car mold line by providing an unique automated apparatus for conveying the pallet cars from a loading station to the pouring and cooling station and thence automatically to the mold separation station.

In accordance therewith, the conveying equipment utilizes a carriage means for conveying a pallet car to the pouring station in such manner that the molds are locked thereon. A first carriage mechanism conveys the pallet cars to the pouring station, the movement thereof being accurately predetermined with reference to the pouring station so that, upon delivery of a pallet car to the pouring station, the molds are accurately positioned with reference to the mold jackets which must be placed thereon prior to the pouring operation.

The pallet car which was previously positioned at the pouring station is automatically moved therefrom to a position adjacent the pouring station. A second carriage mechanism thereupon is actuated so as to further move such previously positioned pallet car to a position more remote from the pouring station thereby leaving an open work area adjacent such station so that the pouring and cooling operation can be performed. At the same time, the movement of the second carriage mechanism automatically unlatches the previously latched pallet car together with the molds thereon at the pouring station. The first and second carriage mechanisms are then automatically retracted to their original positions without disturbing the accurate positioning of the molds at the pouring station and pouring and cooling operations are then completed.

After the poured molds have been appropriately cooled, the pallet car is automatically removed from the pouring station by the subsequent movement of the next succeeding pallet car. As the pallet cars containing the cooled molds are successively removed from the pouring station, they are automatically conveyed to the mold separation station.

The invention can be described in more detail with reference to the attached drawings wherein:

FIGS. 6 and 7 are side views, partially in section, of the latching mechanism of FIG. 4 shown at two stages of its operation.

Figure 1:
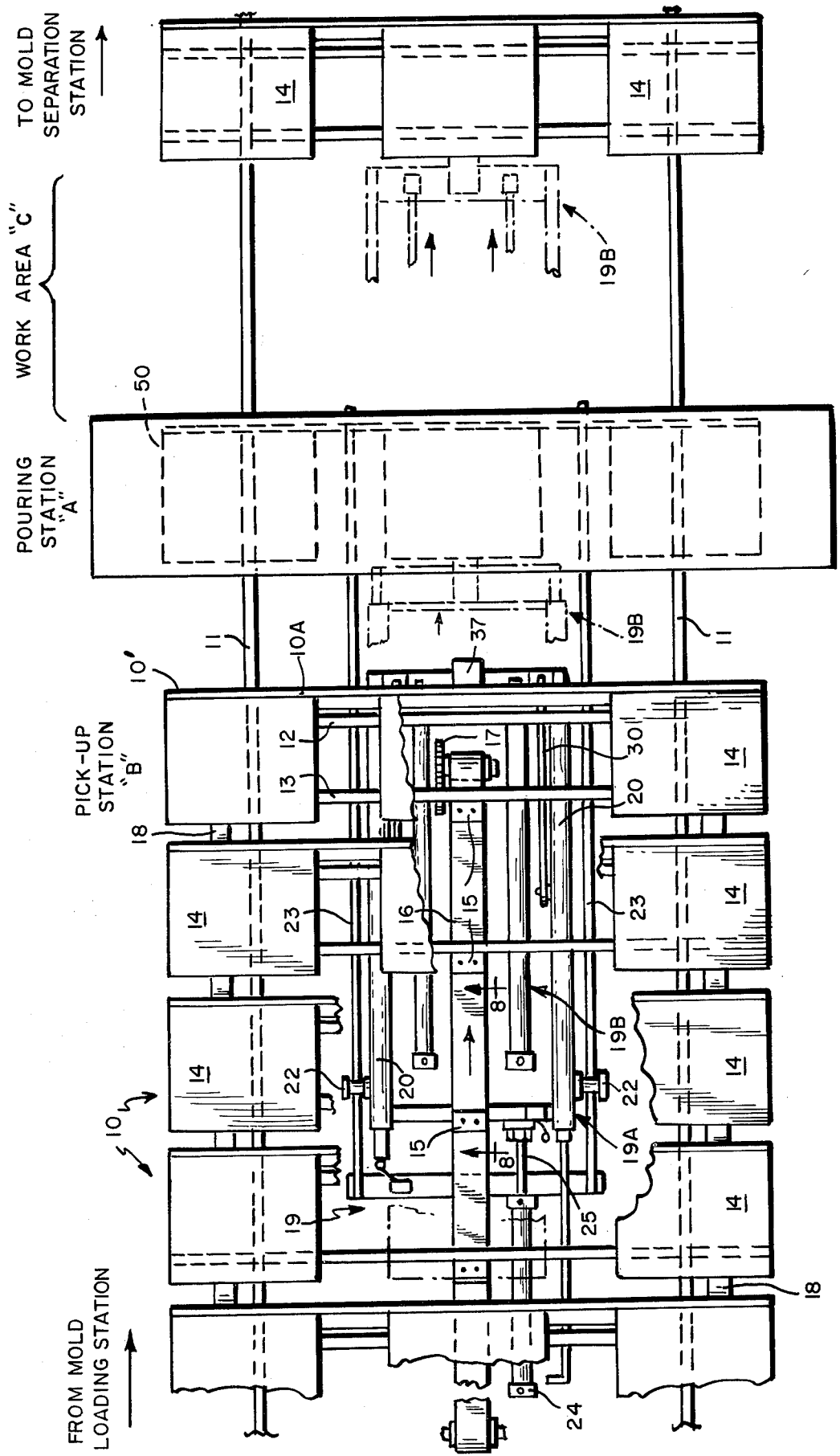
FIG. 1 is a plan view of the overall conveying apparatus with molds partially broken away, the apparatus being shown at one stage of its operation.

As can be seen in FIG. 1, the overall apparatus comprises a path for conveying the loaded pallet cars from a loading station to a pouring station via an intermediate pick-up station as described below. Adjacent the pouring station, designated by reference letter "A," is a work area designated by the reference letter "C," which work area, during the pouring operation, must be kept free to permit a workman to pour the molds. After cooling, molds are conveyed toward a mold separation station where the molds can then be removed and the molded items separated therefrom.

Figure 8:
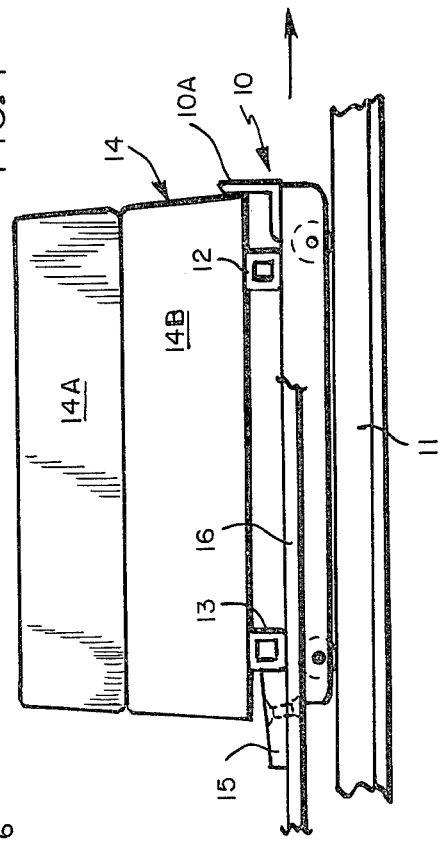
FIG. 8 is a side view of a portion of the system apparatus taken along the lines 8—8 of FIG. 1.

A plurality of pallet cars 10 are moveably mounted on a pair of rails 11, each of such pallet cars including a pair of front and rear cross bars 12 and 13, respectively, on which are carried molds 14 which, as shown in FIG. 8, may comprise separable upper and lower sections 14A and 14B. The molds are loaded on to the pallet cars 10 with the front of the molds abutting an angle member 10A, each car being moved toward the pouring station by the engagement of one of a plurality of blocks 15 with the rear cross bar 13. Blocks 15 are fixedly mounted on an endless belt 16 which is driven through an appropriate gear mechanism 17 suitably connected to a drive motor (not shown) which can be appropriately mounted below the apparatus. Blocks 15 are appropriately spaced along the belt 16 so that the pallet cars are successively positioned so as to prevent contact among them during their travel to the pouring station. Because of the relatively fragile nature of the molds, which in many cases may be sand molds, additional spacers 18 may be placed between adjacent molds to further prevent damage to the molds, such spacers being made of an appropriate resilient material, such as rubber.

Figure 2:
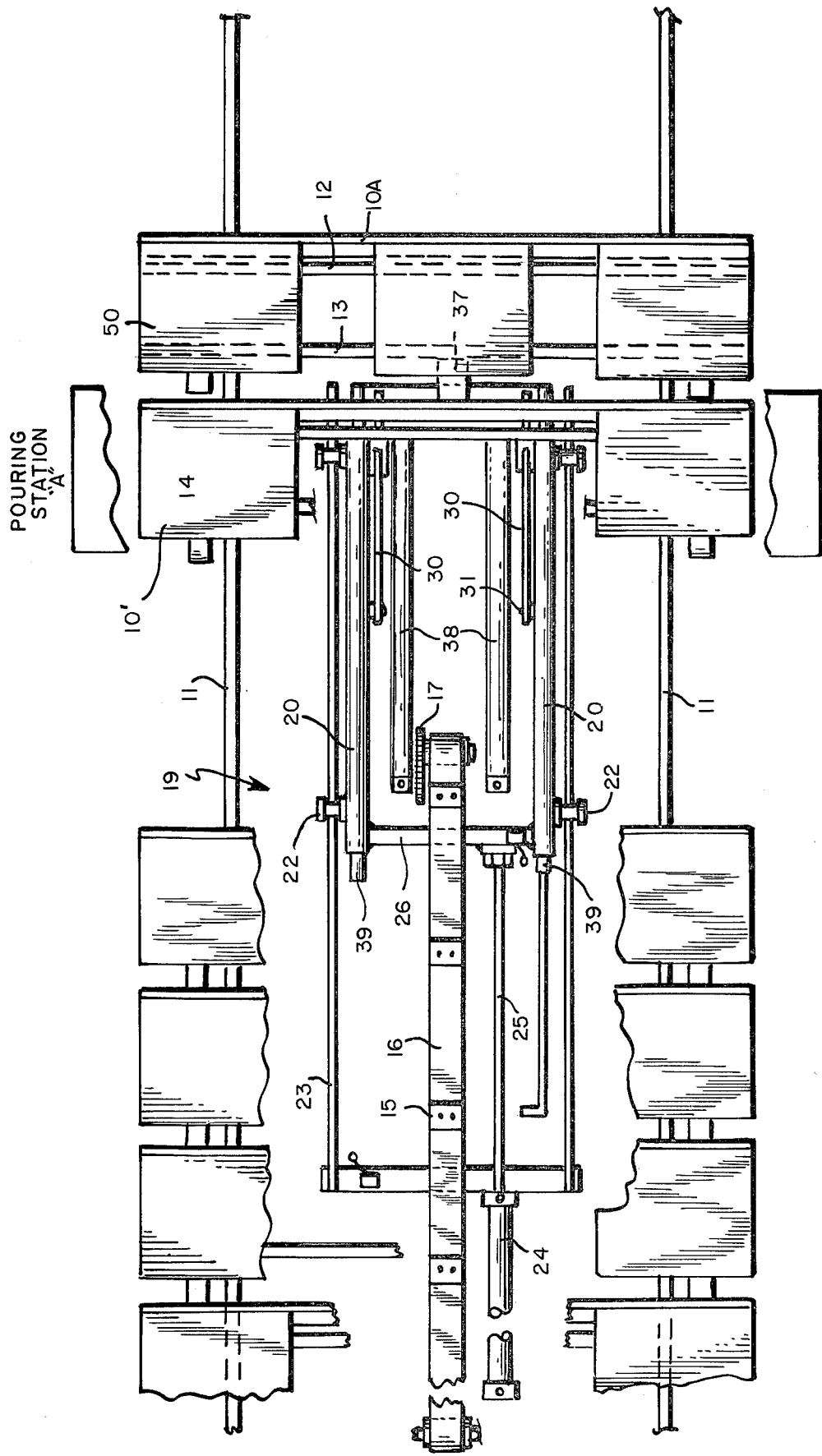
FIG. 2 is a plan view of a portion of the overall apparatus of FIG. 1 at another stage of its operation.

The pallet car is moved by belt 16 to pick-up station near the pouring station "A", such pick-up station being designated by reference letter "B" in the figures. The pallet car at pick-up station B is latched on to a carriage means 19 in a manner described in more detail with reference to FIG. 6. Carriage 19 comprises a first moveable carriage mechanism 19A which includes a pair of tubes 20 to be moved in a longitudinal direction by a plurality of rollers 22 which ride on a pair of outer rails 23. Movement of first carriage mechanism 19A is effected by a conventional hydraulic cylinder piston actuator 24, the actuating piston rod 25 of which is attached to a rear cross bar 26 attached to tubes 20. First carriage mechanism 19A is best shown in FIGS. 1 and 2.

The pallet car and the molds thereon are suitably locked on to first carriage mechanism 19A by a latching arrangement shown in more detail in FIGS. 6 and 7. As seen therein, a pair of main latch arms 30 are pivotally mounted at points 31, the pivot points being attached to the tubes 20. A description of the latching operation is described below with reference to one of said mechanisms, it being understood that the other latches operate similarly.

A spring biased auxiliary latch arm 32 is mounted near the forward portion of main latch arm 30. As angle member 10A and the front cross bar 12 of pallet car 10' move past the front surface of auxiliary latch arm 32, spring element 33 associated therewith forces the arm 32 upward into contact with the rear surface of front cross bar 12. The movement of pallet car 10' is stopped when the front surface of angle member 10A comes into contact with the upwardly projecting portion 30A of main latch arm 30 as shown best in FIG. 6. At that stage, the molds 14 are effectively locked into position on the carriage 19, the pallet car and molds being held between projecting portion 30A and latch arm 32. When the mold has been appropriately locked in position, the pallet car is at pick-up station "B" ready for further travel to the pouring station "A".

Figure 3:
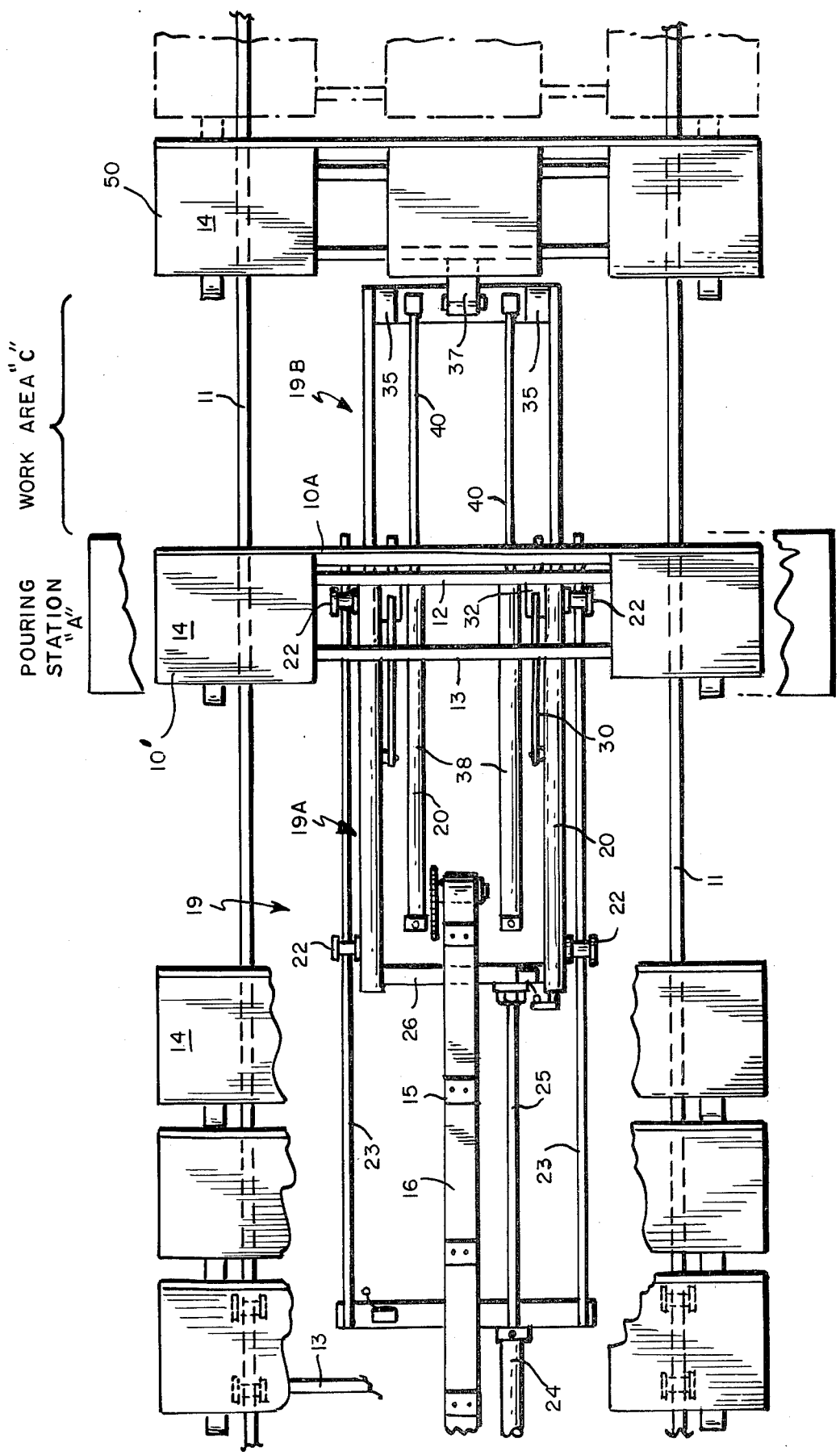
FIG. 3 is a plan view of a portion of the overall apparatus of FIG. 1 at still another stage of its operation.
Figure 5:
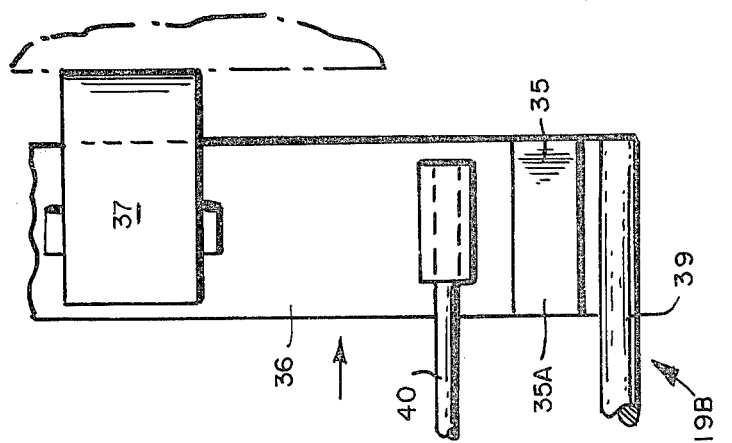
FIG. 5 is a plan view of a portion of the mechanism of FIG. 4.
Figure 4:
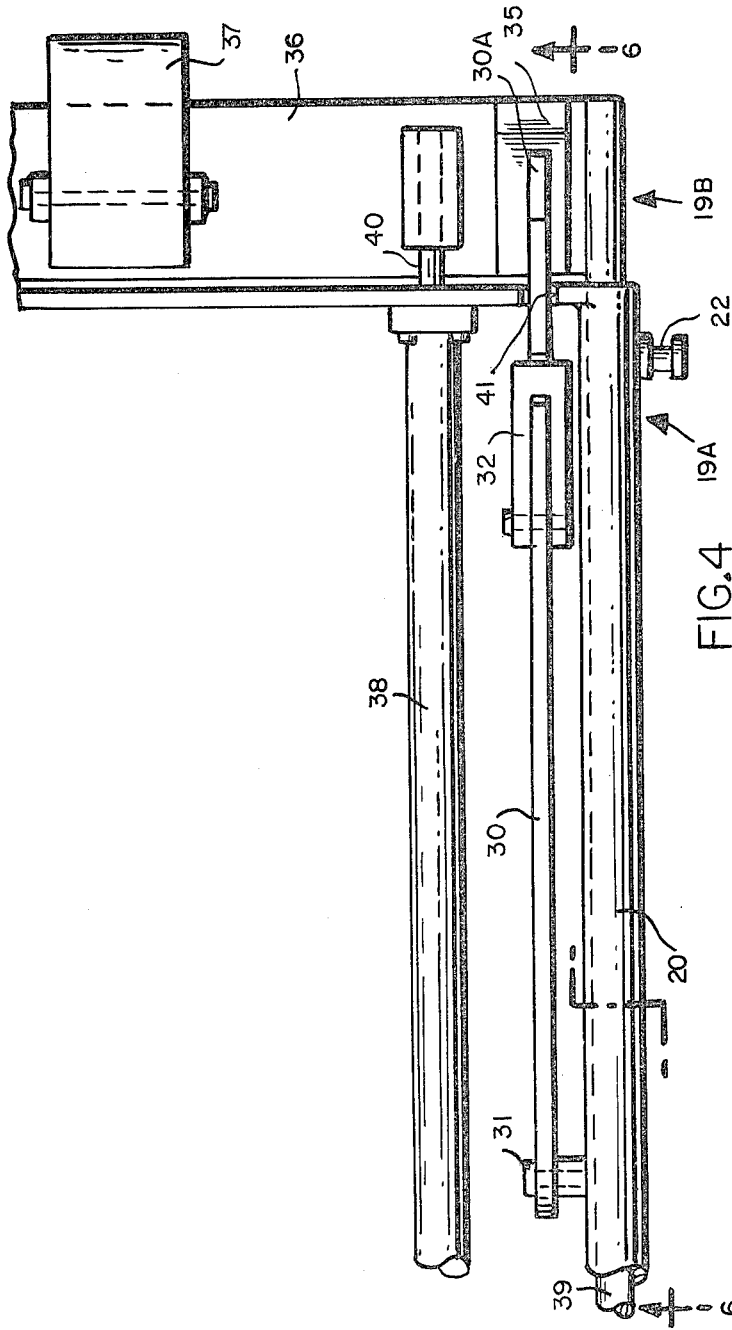
FIG. 4 is an enlarged plan view of a part of the apparatus of FIG. 1 showing particularly the carriage latching mechanism.

The front cam surface 30B of main latch arm 30 is in contact with the cam surface 35A of a cam block 35 so that main latch arm 30 is in its raised position as shown in FIG. 6. Cam blocks 35 are attached to a base plate 36 of a second moveable carriage mechanism 19B which is best shown in FIG. 3. Carriage mechanism 19B includes a pair of rods 39 which are slideably positioned within tubes 20 of first carriage mechanism 19A, base plate 36 being attached at the forward ends of rods 39. A pair of conventional hydraulic cylinder/piston actuators 38 are used to move second carriage mechanism 19B, the hydraulic actuating piston rods 40 being fixedly attached to base plate 36. A pusher arm 37 is fixedly attached to base plate 36 generally at the central region thereof, as shown best in FIGS. 1 and 4, the purpose of such pusher arm being discussed more fully below.

Hydraulic actuator 24 is used to actuate the movement of the pallet car from pick-up station "B" to a predetermined position at the pouring station "A" as shown in FIG. 2. Such position is determined by the stroke of hydraulic actuator 24 which can be appropriately arranged so that when piston rod 25 is in its furthest extended position, molds 14 on pallet car 10 are accurately positioned with reference to the mold jackets at the pouring station.

When the first carriage mechanism 19A is actuated by hydraulic actuator 24, the pusher arm 37 contacts the rear base bar 13 of the pallet car 50 which is immediately ahead of car 10' at the pouring station position "A" as shown in FIGS. 2, 6 and 7. Accordingly, such immediately preceding pallet car 50 and the molds thereon are automatically moved away from the pouring station to a position adjacent thereto as shown in FIG. 2.

At such latter position, pallet car 50 is located in the work area "C" which, in the particular embodiment being described, is to be used by a workman for pouring the molten material into the molds at the pouring station. Accordingly, pallet car 50 must be moved away from the work area in the direction toward the mold separation station. Such movement is accomplished through the actuation of second carriage mechanism 19B by hydraulic actuators 38. When the piston rods 40 thereof are moved to their fully extended positions, as shown in FIG. 3, pusher arm 37 moves pallet car 50 to a new position beyond the work area "C" so that the latter area is available for use.

As the base plate 36 of second carriage mechanism 19B moves away from the pouring station, cam block 35 moves with it, thereby permitting main latch arm 30 to drop to its lower position as shown in FIG. 7. Latch arm 30 has an appropriate notch 41 which engages a stop bar 42 as shown therein. When latch arm 30 is in its lower position, the auxiliary latch arm 32 and the projecting portion 30A of main latch arm 30 are positioned below the cross-bars 12 and 13 and angle member 10A of pallet car 10'. Accordingly, when the first carriage mechanism is retracted through the reverse actuation of hydraulic actuator 24, the main latch arm passes completely under the pallet car without disturbing the position of the molds at the pouring station. Pusher arm 37 is also spring mounted so that as second carriage mechanism 19B is retracted, pusher arm 37 is depressed and can pass under angle member 10A and cross bars 12 and 13 also without disturbing the position of molds 14 at the pouring station.

When the molds are in position at pouring station "A" and the immediately preceding pallet car has been removed from the work area, the carriage mechanism 19A and 19B can be moved back to their original positions at the pick-up station "B." First carriage mechanism 19A is retracted first so that it returns to its position shown in FIG. 1. Second carriage mechanism 19B is then retracted so that both mechanisms are in their original positions shown in FIG. 1, ready to pick up the next pallet car which has moved into pick-up station "B." The retraction of the carriage mechanism thereupon fully opens the work area so that a workman can proceed with the appropriate pouring and cooling operation. A suitable embodiment of a structure and the use thereof in the latter process is described in the aforesaid MacIntier patent and need not be described in further detail here. Thus, the molds jackets used herein as described therein are appropriately actuated so as to engage the molds. The workman can then pour the molten material into the molds and set an appropriate cooling timer (not shown). After the molded element has been suitably cooled, a suitable mechanism is actuated for removing the mold jackets, after which time the operating cycle described above can begin again, the then cooled molds on the pallet car located at the pouring station being ready to be moved out toward the mold separation station in accordance with the operation previously described.

The pallet cars which are successively removed from the pouring station are appropriately stacked up on rails 11 and can be moved to the mold separation station, for example, by gravity each pallet car being pushed toward the mold separation station by the immediately secceeding pallet car to its left, as shown in the figures, via the contact of the spacers between the molds.

In summary, the overall cycle of operation permits pallet cars carrying a plurality of molds to be automatically and successively carried from a loading station to a pick-up station where they are suitably locked on to a carriage prior to the pouring station operation. The carriage is arranged to move the pallet cars to the pouring station so that the molds thereon are in accurately aligned positions at the pouring station. The carriage arrangement automatically pushes the pallet car and molds which were previously located at the pouring station to a position sufficiently removed therefrom to free a work area so that the pouring operation can be completed. A suitable latching mechanism for locking the molds to the carriage is arranged so that retraction of the carriage to its original position at the pick-up station can be achieved prior to the pouring operation without disturbing the accurately positioned molds at the pouring station.

I claim:

1. An apparatus for automatically conveying pallet cars, each carrying at least one mold thereon, from a mold loading station to a mold pouring station, said apparatus comprising
    means for moving said pallet cars from said loading station to a pick-up station;
    carriage means at said pick-up station, said carriage means including means for latching pallet car on to said carriage means so that the molds thereon are locked in position thereon;
    means for moving said latched pallet car from said pick-up station to said pouring station, said movement causing the molds on said pallet car to be positioned at a preselected location at said pouring station and further causing a pallet car previously positioned at said pouring station to be moved therefrom to a position adjacent said pouring station;
    means for further moving said carriage means to cause said previously positioned pallet car to be moved from said adjacent position to a position more remote from said pouring station and further to cause said latched pallet car to be unlatched from said carriage means whereby said unlatched pallet car and the molds thereon remain at said preselected location at said pouring station; and
    means for retracting said carriage means to its initial position at said pick-up station.

2. An apparatus for automatically conveying pallet cars, each carrying at least one mold thereon, from a mold loading station to a mold pouring station, said apparatus comprising
    means for moving said pallet cars from said loading station to a pick-up station;
    carriage means at said pick-up station, said carriage means having first and second moveable carriage mechanisms each located at predetermined initial positions at said pick-up station, said carriage means further including latching means on said first carriage mechanism for latching a pallet car on to said carriage means so that the molds thereon are locked in position thereon;
    means for moving said first and second carriage mechanisms from their positions at said pick-up station to a first predetermined extended position to convey said latched pallet car from said pick-up station to said pouring station, said movement of said carriage mechanisms thereby causing the molds on said pallet car to be positioned at a preselected location at said pouring station and further causing a pallet car previously positioned at said pouring station to be moved therefrom to a position adjacent said pouring station;
    means for moving said second carriage mechanism to a second predetermined extended position relative to said first carriage mechanism, said movement causing said previously positioned pallet car to be moved from said adjacent position to a position more remote from said pouring station and further causing said latched pallet car to be unlatched from said first carriage mechanism whereby said unlatched pallet car and the molds thereon remain at said preselected location at said pouring station; and
    means for retracting said first and second carriage mechanisms to move said mechanisms from their extended positions to their initial positions at said pick-up station.

3. An apparatus in accordance with claim 2 wherein said latching means includes
    locking means moveable from a first position at which said pallet car and molds thereon are locked on to said first carriage mechanism to a second position at which said pallet car and molds thereon are unlatched.

4. An apparatus in accordance with claim 3 wherein said pallet car includes
    an angle member at the front thereof; and
    front and rear cross-bars, the mold being placed on said cross-bars so that the front of said molds abut said angle member.

5. An apparatus in accordance with claim 4 wherein said locking means includes
    a pair of main latch arms, each pivotally moveable from said first position to said second position;
    an auxiliary latch arm mounted on each said main latch arm;
    an upwardly projecting portion at one end of each said main latch arm;
    said main arms and said auxiliary latch arms being arranged so that when said main latch arms are in their first position, said front cross-bar and said angle member are locked between said auxiliary latch arms and said upwardly projection portions.

6. An apparatus in accordance with claim 5 wherein said main and auxiliary arms are arranged so that when said main latch arms are in their second positions, said front cross-bars and said angle member are released from their locked positions to unlatch said pallet car and the molds thereon and said first carriage mechanism can be retracted without disturbing the position of the pallet car and molds thereon.

7. An apparatus in accordance with claim 6 wherein said each main latch arm has a first cam surface; said second carriage mechanism has a pair of cam blocks, each having a second cam surface in contact with the first cam surface of said main latch arms when the latter are in said first position; said cam block surfaces being removed from their corresponding said first cam surfaces when said second carriage mechanism is moved to its second predetermined extended position whereby said main latch arms are moved to their said second positions to unlatch said pallet car and the molds thereon.

8. An apparatus in accordance with claim 2 wherein the movement of said first and second carriage mechanisms are hydraulically actuated.

9. An apparatus in accordance with claim 1 wherein said means for moving said pallet cars from the mold loading station to said pick-up station includes
an endless moveable belt; and
a plurality of means spaced along said belt for engaging said pallet cars during the movement of said belt to move said cars to said pick-up station.

* * * * *